(12) United States Patent
Bar-On et al.

(10) Patent No.: US 10,356,433 B2
(45) Date of Patent: Jul. 16, 2019

(54) UNIVERSAL VIDEO CODEC

(71) Applicant: Numeri Ltd., Haifa (IL)

(72) Inventors: Ilan Bar-On, Haifa (IL); Oleg Kostenko, Haifa (IL)

(73) Assignee: Numeri Ltd., Haifa (IL)

( * ) Notice: Subject to any disclaimer, the term of this patent is extended or adjusted under 35 U.S.C. 154(b) by 101 days.

(21) Appl. No.: 15/323,899

(22) PCT Filed: Jun. 24, 2015

(86) PCT No.: PCT/IB2015/054735
§ 371 (c)(1),
(2) Date: Jan. 4, 2017

(87) PCT Pub. No.: WO2016/005844
PCT Pub. Date: Jan. 14, 2016

(65) Prior Publication Data
US 2017/0150163 A1    May 25, 2017

Related U.S. Application Data

(60) Provisional application No. 62/022,227, filed on Jul. 9, 2014.

(51) Int. Cl.
*H04N 19/172* (2014.01)
*H04N 19/156* (2014.01)
(Continued)

(52) U.S. Cl.
CPC ......... *H04N 19/463* (2014.11); *H04N 19/124* (2014.11); *H04N 19/156* (2014.11);
(Continued)

(58) Field of Classification Search
CPC .. H04N 19/463; H04N 19/192; H04N 19/124; H04N 19/176; H04N 19/436; H04N 19/172; H04N 19/156
(Continued)

(56) References Cited

U.S. PATENT DOCUMENTS

| 5,067,015 A | 11/1991 | Combridge et al. |
| 5,995,080 A | 11/1999 | Biro et al. |

(Continued)

FOREIGN PATENT DOCUMENTS

| EP | 1298937 A1 | 4/2003 |
| WO | 2014053982 A2 | 9/2013 |
| WO | 2014207643 A1 | 6/2014 |

OTHER PUBLICATIONS

Po-Chyi Su et al: "Constant frame quality control for H.264/AVC". Signal 7 Information Processing Association Annual Summit and Conference (APSIPA ASC), Asia-Pacific, IEEE, Dec. 3, 2012 (Dec. 3, 2012), pp. 1-6, XP032310054, ISBN: 978-1-4673-4863-8 * section III last paragraph.

*Primary Examiner* — Jared Walker
(74) *Attorney, Agent, or Firm* — Gable Gotwals (57) ABSTRACT

A method of video compression comprising: (a) receiving a first block of video frames; (b) fully compressing the first one or more video frames and partially compressing the other frames in said block of video frames; (c) optionally adding a next block of video frames to the already processed video frames, wherein said processed video frames comprises fully decoded video frames and partially decoded video frames; (d) fully compressing the next one or more frames and partially compressing other frames in said already processed video frames and said optionally next block of video frames; and repeating steps (c) and (d).

13 Claims, 9 Drawing Sheets

The Universal video compression algorithm - initial stage.

(51) Int. Cl.
  *H04N 19/176* (2014.01)
  *H04N 19/192* (2014.01)
  *H04N 19/463* (2014.01)
  *H04N 19/436* (2014.01)
  *H04N 19/124* (2014.01)

(52) U.S. Cl.
  CPC ......... *H04N 19/172* (2014.11); *H04N 19/176* (2014.11); *H04N 19/192* (2014.11); *H04N 19/436* (2014.11)

(58) Field of Classification Search
  USPC .................................................. 375/240.12
  See application file for complete search history.

(56) References Cited

U.S. PATENT DOCUMENTS

| | | | |
|---|---|---|---|
| 2007/0223579 A1 | 9/2007 | Bao | |
| 2008/0285650 A1* | 11/2008 | Chappalli | H04N 7/0132 375/240.16 |
| 2009/0232208 A1* | 9/2009 | Lee | H04N 19/61 375/240.12 |
| 2011/0032994 A1 | 2/2011 | Bar-On et al. | |
| 2014/0119434 A1* | 5/2014 | Zhang | H04N 19/176 375/240.03 |
| 2014/0161367 A1* | 6/2014 | Ridenour | H04N 19/115 382/233 |
| 2014/0269896 A1 | 9/2014 | Dao | |

\* cited by examiner

The input to the Encoding unit - initial stage.

The input to the Encoding unit - stage n.

FIG. 8

Output from the Reconstructing Unit – Stage n

FIG. 9

UNIVERSAL VIDEO CODEC

CROSS-REFERENCE TO RELATED PATENT APPLICATIONS

This patent application claims priority from and is related to U.S. Provisional Patent Application Ser. No. 62/022,227, filed 9 Jul. 2014, this U.S. Provisional Patent Application incorporated by reference in its entirety herein.

TECHNOLOGY FIELD

The present invention is in the field of video processing.

BACKGROUND

Raw video files are huge. For example, an Ultra High Definition (UHD) movie with 120 frames per second (fps), 3840×2160 pixels per frame, 3 colors per pixel, and 16 bits per color, requires bandwidth of:
  3840*2160*120*3*16=47,775,744,000 Bits per sec≈50 Giga bits per sec, equivalent to about 500 high speed (100 Mbps) fiber channels.
If the movie last for two hours, as usual, it requires storage of:
  47,775,744,000*7,200≈343,985 Giga bits≈45 Tera bytes, equivalent to about 9,000 regular (5 Gbytes) DVD disks.
Video compression,
  "The art of reducing the video size without affecting its visual quality", is therefore a necessary tool for any applications that deals with video.
In general, a video consists of several components, such as in the RGB color space or in the YUV color space. However, without loss of generality we consider here only one such component.

PCT application no. PCT/IB2013/059007 to the same applicant provides a video frame compression method given the entire video (or cut), namely frames preceding and following the currently compressed frame.

PCT application no. PCT/IB2014/062524 to the same applicant provides a video frame compression method given at least part of the preceding frames.

U.S. application Ser. No. 12/448,733 to the same applicant provides Entropy Coding/Decoding methods for image and video compression.

SUMMARY

In a first aspect of the present invention there is provided a method of video compression comprising: (a) receiving a block of video frames; (b) fully compressing the first one or more video frames and partially compressing the other frames in said block of video frames; (c) optionally adding a next block of video frames to the already processed video, wherein said processed video comprises fully decoded compressed video frames and partially decoded compressed video frames; (d) fully compressing the next one or more frames and partially compressing the other frames in said already processed video and said optionally next block of video frames; and repeating steps (c) and (d).

In a second aspect of the present invention there is provided a method of video decompression comprising: decoding a plurality of video frames, said decoding comprising decoding a fully compressed first one or more video frames and partially compressed other frames in said plurality of video frames; and repeatedly decoding a next fully compressed one or more video frames and partially compressed video frames.

In a third aspect of the present invention there is provided a video codec comprising: an encoding unit configured to: a. receive a block of video frames; b. fully encode the first one or more video frames and partially encode the other frames in said block of video frames; c. optionally add a next block of video frames to the already processed video, wherein said processed video comprises fully decoded video frames and partially decoded video frames; d. fully encode the next one or more frames and partially encode the other frames in said already processed video frames and said optionally next block of video frames; and e. repeat steps c) and d); an entropy coding unit configured to create a compressed bitstream from said encoded frames, said compressed bitstream serves as input to the decoder; an entropy decoding unit configured to receive the compressed bitstream and decompress it to a plurality of encoded video frames; and a reconstructing unit configured to fully decode the first one or more video frames and partially decode the other frames in said plurality of video frames; and repeatedly fully decode the next one or more video frames and partially decode the other video frames.

The next block of video frames may comprise a predefined number of video frames.

The next block of video frames may comprise only one frame.

The next block of video frames may be adapted dynamically to satisfy working conditions.

The working conditions may comprise at least one of: desired latency, fluctuations in the network bandwidth, memory constraints, CPU power and GPU availability.

DETAILED DESCRIPTION OF THE INVENTION

The present invention provides a new video compression algorithm that generalizes the algorithms presented in Pat [1], and Pat [2]. For example, in Pat [2] we presented the No Latency video codec whereby the algorithm is limited by latency constraints to that of processing only one new frame at each step. In the present invention this is generalized to the processing of any number of new frames at each step. More generally the present invention adapts itself dynamically to the existing working conditions such as the required latency, the fluctuations in the network bandwidth, the memory constraints, the CPU power, the GPU availability etc.

DEFINITIONS

1. The terms "compress", "compressed", "compression" and "encode", "encoded", "encoding" are used respectively throughout this document interchangeably.
2. The terms "decompress", "decompressed", "decompression" and "decode", "decoded", "decoding" are used respectively throughout this document interchangeably.
3. Fully compressed video frame: a video frame which has undergone a full compression process according to the existing working conditions and will not be further compressed. In other words, all the data required for fully compressing the video frame is available from previous fully compressed frames and later partially compressed frames.

A fully compressed video frame is created by fully compressing a partially compressed video frame or a non-compressed video frame.
4. Partially compressed video frame: a video frame which has undergone a partial compression process, namely according to the existing working conditions the frame needs to be further compressed. In other words, not all the data required for fully compressing the video frame is available from previous fully compressed frames and later partially compressed frames. Video frames may be in various stages of partial compression.

A partially compressed video frame is created by partially compressing a previously partially compressed video frame or a non-compressed video frame.

In the following description and examples reference is made to one frame being fully encoded and decoded at each step, however this limitation has been introduced for simplifying the explanation and it is understood that the method of the present invention lends itself to more than one frame being encoded and decoded at each step.

Figure 1:
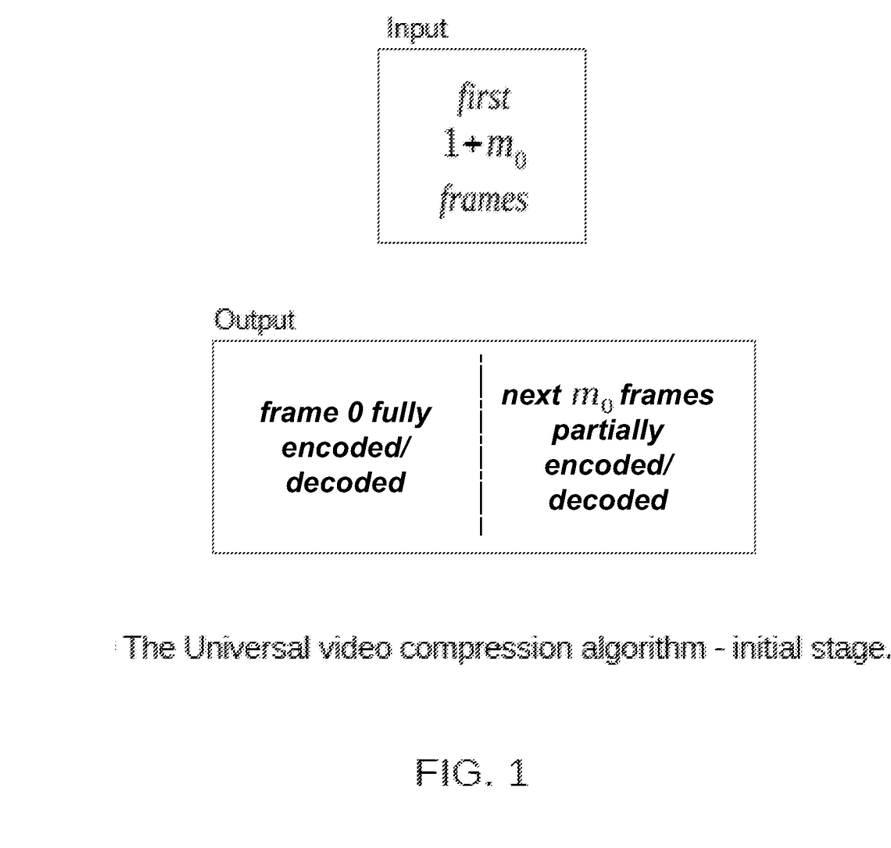
FIG. 1 is a diagram of the Universal video compression algorithm—initial stage.
Figure 2:
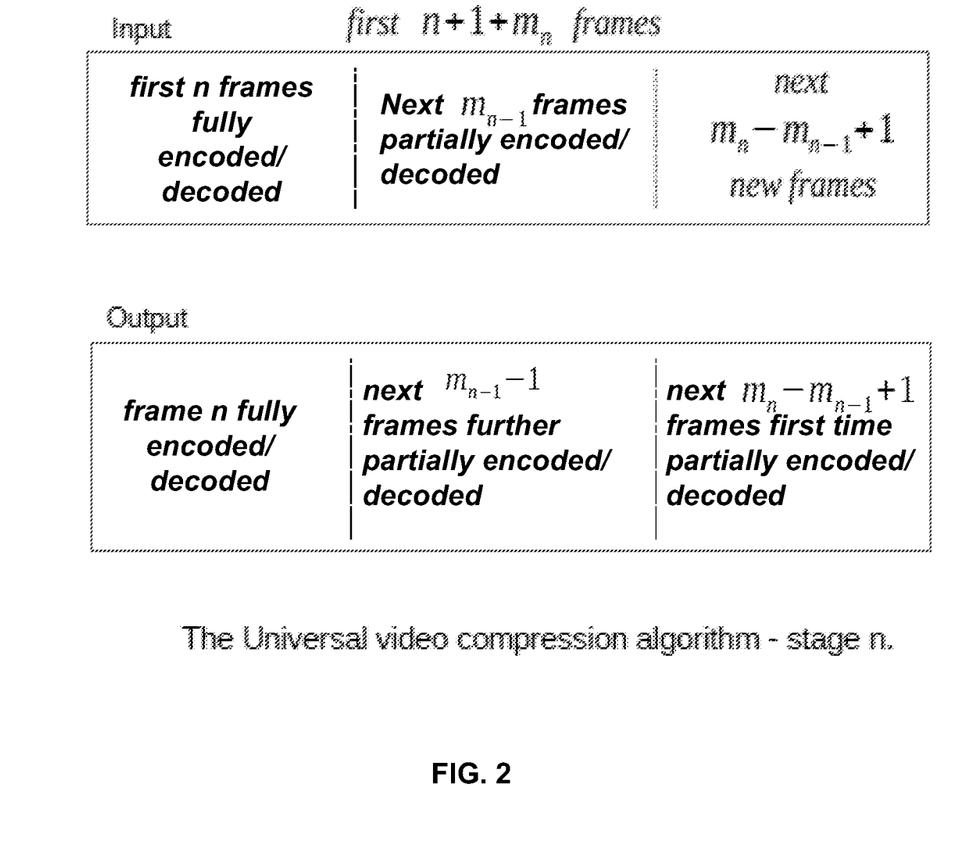
FIG. 2 is a diagram of the Universal video compression algorithm—stage n.

In FIGS. 1 and 2, we describe the new Universal video compression algorithm. At each step, a new frame is being fully encoded and decoded and possibly displayed. Namely, at step n, n=0, . . . , N, where N is the total number of video frames, frame number n is being fully encoded and decoded and possibly displayed.

This is done as follows:

Initially, at step n=0, see FIG. 1, the first $1+m_0$ frames, where $m_0 \geq 0$, are processed, and The first frame, frame number n=0, is being fully encoded/decoded and possibly displayed.

The next $m_0$ frames are being partially encoded/decoded.

Then, at step n=1, . . . , N, see FIG. 2, the first $n+1+m_n$ frames, where $$1+m_n \geq m_{n-1}, m_n \geq 0$$

are processed. Here,

The first n frames have already been fully encoded/decoded.

The next $m_{n-1}$ frames have already been partially encoded/decoded.

The next $m_n - m_{n-1} + 1$ frames are new frames.

The result of this step is:

A new next frame, namely frame number n, being fully encoded/decoded and possibly displayed.

In case $m_{n-1} > 1$, the next $m_{n-1} - 1$ frames being further partially encoded/decoded.

The next new $m_n - m_{n-1} + 1$ frames being partially encoded/decoded for the first time.

Figure 3:
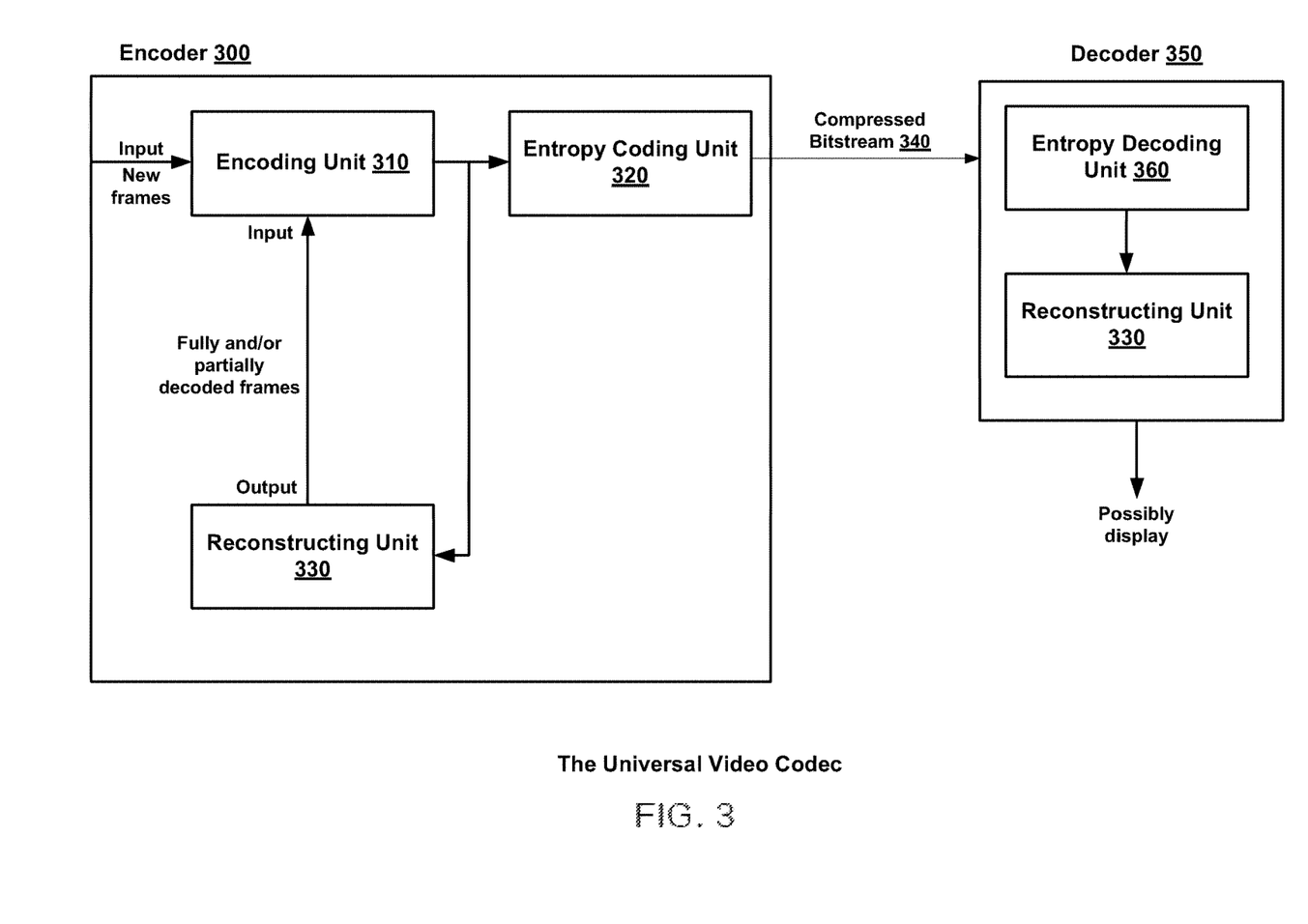
FIG. 3 is a diagram of the Universal Video Codec.

The Universal Video Codec is depicted in FIG. 3. It consists of the following:

An Encoder 300 having three main components:
the Encoding unit 310,
the Entropy Coding unit 320; and
the Reconstructing unit 330.
The compressed bitstream 340.
A Decoder 350 having two main components:
the Entropy Decoding unit 360; and
the Reconstructing unit 330.

The input to the Encoding unit is the correspondingly next new frames, and the correspondingly previously fully or/and partially decoded frames, see FIGS. 1 and 2. The output from the Encoding unit is the correspondingly resulting fully and/or partially encoded frames. The output from the Encoding unit is fed as input to both the Entropy Coding unit and to the Reconstructing unit.

The Entropy Coding unit uses entropy coding methods such as discussed in Pat[3] to compress the resulting fully and/or partially encoded frames into the compressed bitstream. The Reconstructing unit applying the operations done in the Encoding unit, in a reverse order, reconstructs the correspondingly fully and/or partially decoded frames. These decoded frames are then fed back to the Encoding unit as an additional input for the next step as discussed above.

The compressed bitstream which is the output from the Encoder is also the input to the Decoder. The compressed bitstream is the input to the Entropy Decoding unit. The output from the Entropy Decoding unit is the fully and/or partially encoded frames, and is the same as the output from the Encoding unit.

The Decoder Reconstructing unit is therefore the same as that of the Encoder and it serves to reconstruct the correspondingly fully and/or partially decoded frames. The Decoder may now display the correspondingly next fully decoded frames, see FIG. 2.

Figure 4:
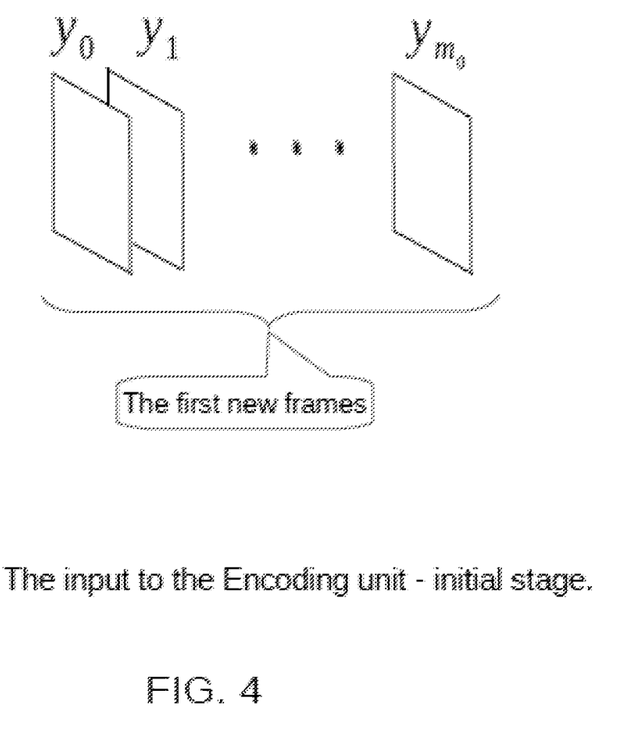
FIG. 4 is a diagram of the input to the Encoding unit—initial stage.
Figure 5:
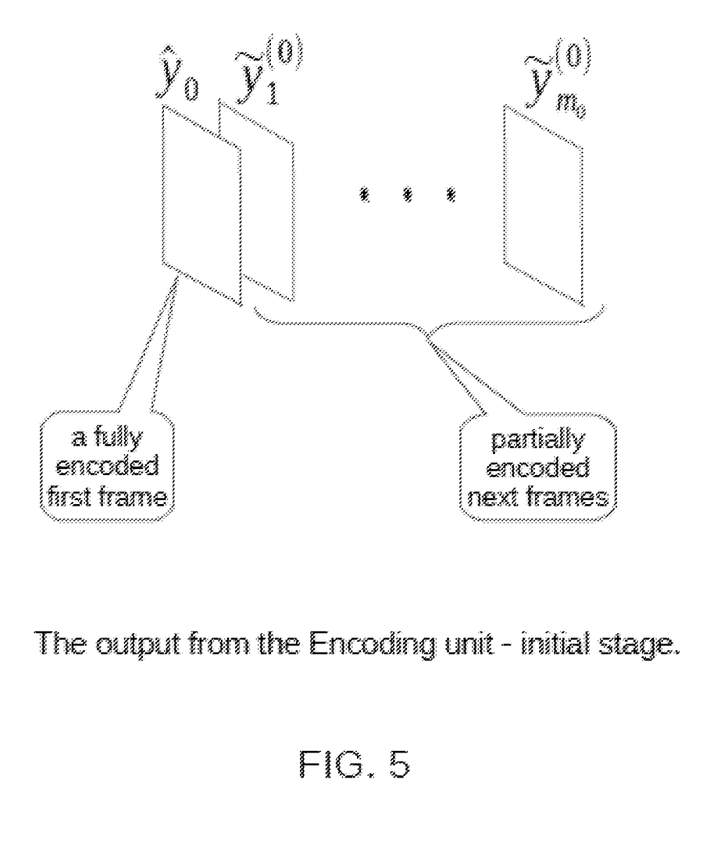
FIG. 5 is a diagram of the output from the Encoding unit—initial stage.
Figure 6:
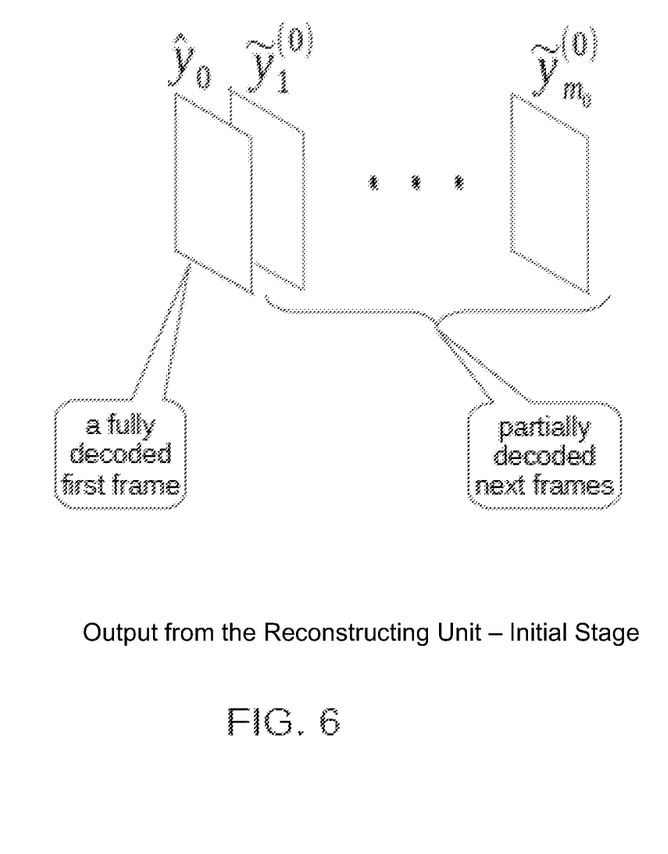
FIG. 6 is a diagram of the output from the Reconstructing unit—initial stage.

In FIG. 4, we depict the input to the initial stage of the Encoding unit. The input consists of the first $1+m_0$ frames of the video. These frames are processed by the Encoding unit and the result is a fully encoded first frame, and the partially encoded next $m_0$ frames, see FIG. 5. The Encoding is done as in Pat [1] and Pat [2], only that now the next $m_0$ frames are considered to be only partially encoded and not fully encoded. The encoded frames are then sent to the Entropy Encoding unit which creates the compressed bitstream as discussed above. This compressed bitstream contains the fully compressed first frame, and the partially compressed next frames. The encoded frames are also fed back to the Reconstructing unit of the Encoder, as described in FIG. 3. In FIG. 6, we depict the result of the initial stage of the Decoder. The result is a fully decoded first frame, and the partially decoded next $m_0$ frames. At this point, the Decoder may also display the fully decoded first frame. Again, decoding is done as in Pat [1] and Pat [2], with the similar observation that now the next $m_0$ frames are considered to be only partially decoded and not fully decoded.

Figure 7:
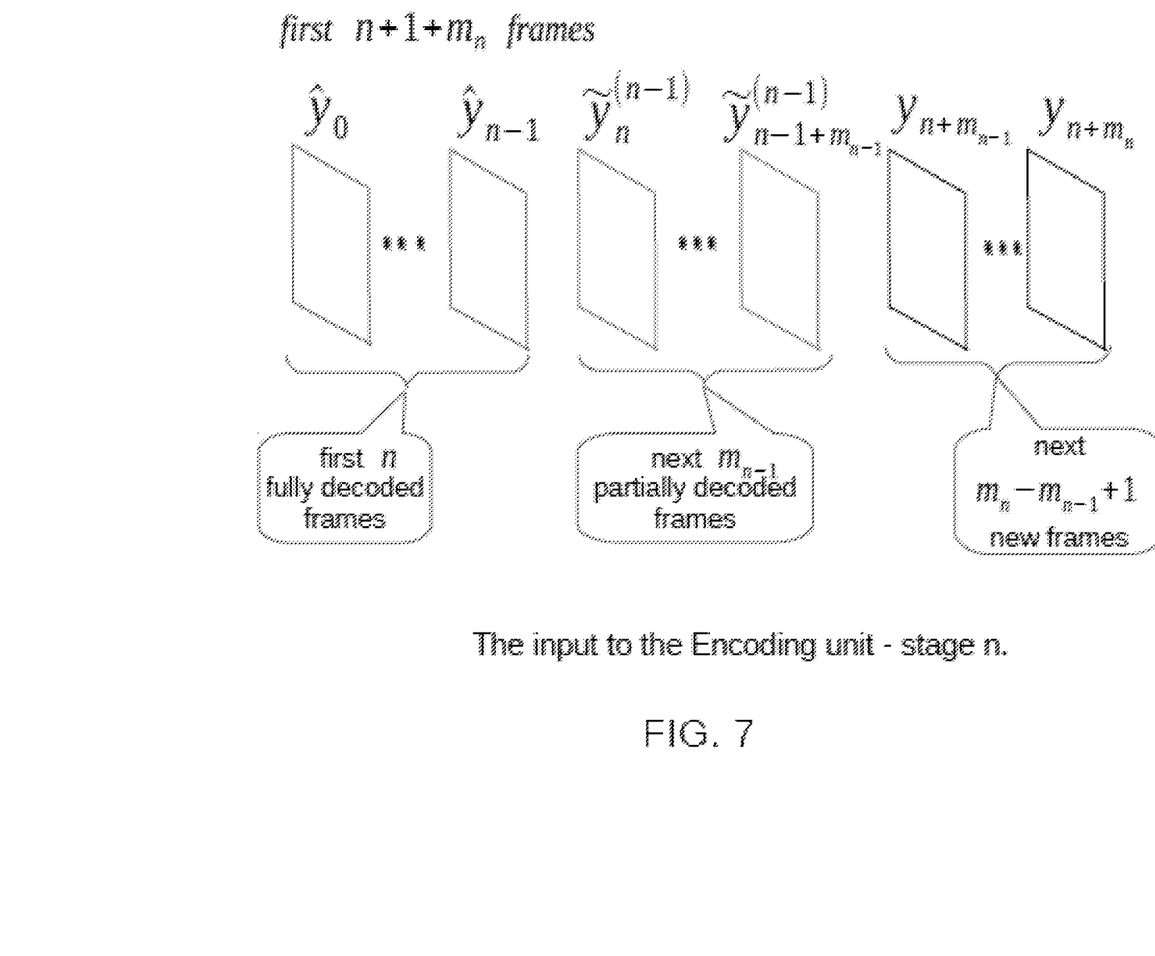
FIG. 7 is a diagram of the input to the Encoding unit—stage n.
Figure 8:
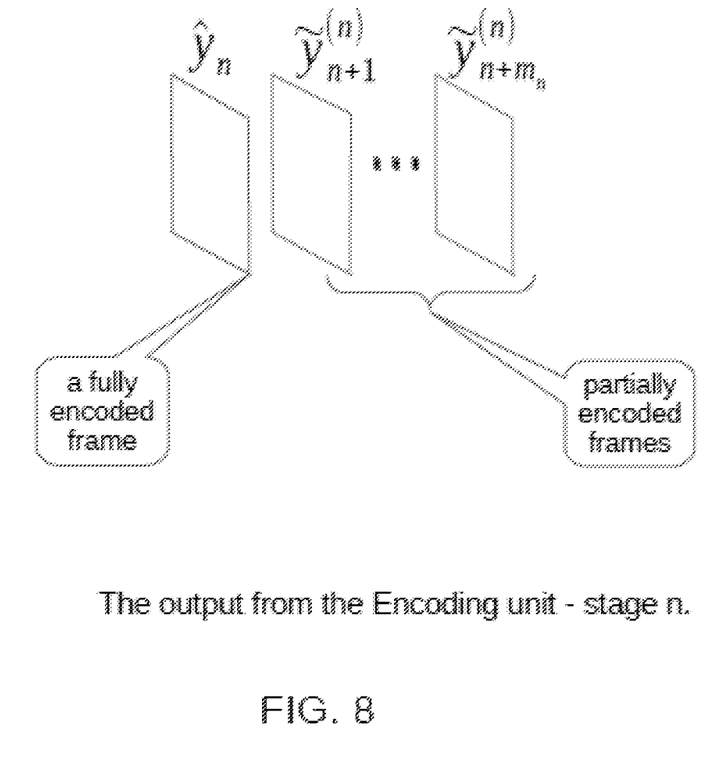
FIG. 8 is a diagram of the output from the Encoding unit—stage n.

In FIG. 7, we depict the input to the Encoding unit stage n. The input consists of the first $n+1+m_n$ frames of which; n are the first fully decoded frames; the next $m_{n-1}$ frames are the partially decoded frames from the previous stages; and the next $m_n - m_{n-1} + 1$ frames are the next new frames. These frames are processed by the Encoding unit and the result is a new fully encoded next frame, that is frame number n, and the next $m_n$ partially encoded frames, see FIG. 8. Again, the Encoding is done as in Pat [1] and Pat [2], where the next $m_n$ frames are considered to be only partially encoded and not fully encoded. The encoded frames are then sent to the Entropy Encoding unit which creates the compressed bitstream as discussed above. The encoded frames are also fed back to the Reconstructing unit of the Encoder, as described in FIG. 3.

Figure 9:
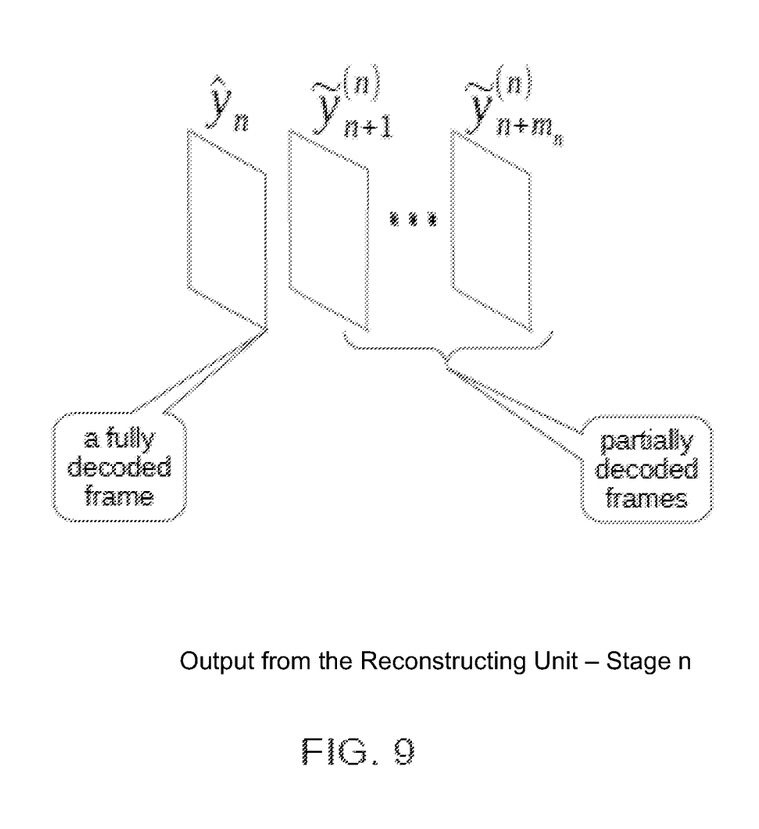
FIG. 9 is a diagram of the output from the Reconstructing unit—stage n.

In FIG. 9, we depict the result of stage n of the Decoder. The result is a fully decoded next frame, that is frame number n, and the partially decoded next $m_n$ frames. At this point, the Decoder may also display the new fully decoded frame, namely frame number n. Again, decoding is done as in Pat [1] and Pat [2], with the similar observation that now the next $m_n$ frames are considered to be only partially decoded and not fully decoded.

To conclude, in all the discussions above, one can replace the statement "fully encoding/decoding the first/next video frame", with the corresponding text of "fully encoding/decoding the first/next one or more video frames" with no significant change to the structure of the algorithm.

A Working Example Describing Partial and Full Compression

Assume for simplicity that we have a monochrome video (no color), where each frame consists of 1 row and 4 columns only, and that we have a total of 4 frames.

Denote the pixels of the 4 input frames by:
X=(69, 121, 91, 129),
Y=(65, 105, 114, 136),
Z=(85, 134, 66, 125),
W=(35, 86, 158, 136)

Then, to represent the video using 8 bits per pixel, requires 128 bits.

The following method utilizing partial and full compression requires only 48 bits.

Stage I:
We start by compressing the pixels of frames Z and Y to the nearest multiples of 20, $$Z=(85,134,66,125) \rightarrow (80,140,60,120)=(4,7,3,6)*20,$$

$$Y=(65,105,114,136) \rightarrow (60,100,120,140)=(3,5,6,7)*20,$$

And compressing X, by setting $$X=(Z+Y)/2=(70,120,90,130).$$

Note that after this stage, X will not be further compressed, and therefore it is called a fully compressed frame. Frames Y and Z will go through further compression and are therefore called partially compressed frames.

We require 3 bits to represent the coefficients of Y and Z for a total of 24 bits.

Stage II:
We now compress W to the nearest multiples of 20, namely $$W=(35,86,158,136) \rightarrow (40,80,160,140)=(2,4,8,7)*20.$$

We further update Z to the nearest multiple of 10, namely, $$Z=(80,140,60,120) \rightarrow Z+(1,-1,1,1)*10=(90,130,70,130).$$

Then we compress Y by setting $$Y=(W+Z)/2=(65,105,115,135).$$

Note that by this stage, Y has also become fully compressed, and Z and W are yet partially compressed.

We now require additional 12 bits for representing W, and 4 bits for the update of Z, for a total of 40 bits altogether.

Stage III
We now update Z to the nearest multiples of 5, namely $$Z=(90,130,70,130) \rightarrow Z+(-1,1,-1,-1)*5=(85,135,65,125).$$

Then we update W by the same method, replacing the factor 5 by 10, namely $$W=(40,80,160,140) \rightarrow W+(-1,1,-1,-1)*10=(30,90,150,130)$$

After this stage, Z is fully compressed, and W is still partially compressed.

We require 4 more bits for this stage, for a total of 44 bits.

Stage IV
Finally, we update W to the nearest multiples of 5, namely $$W=(30,90,150,130) \rightarrow W+(1,-1,1,1)*5=(35,85,155,135)$$

Now W has also become fully compressed.

We require 4 more bits for this stage, for a total of 48 bits.

To conclude: using partial compressed frames we received almost the same result:

$$X=(69,121,91,129), \rightarrow (70,120,90,130)$$

$$Y=(65,105,114,136), \rightarrow (65,105,115,135)$$

$$Z=(85,134,66,125), \rightarrow (85,135,65,125)$$

$$W=(35,86,154,136) \rightarrow (35,85,155,135)$$

Using only about one third of the number of bits used at first.

As will be appreciated by one skilled in the art, aspects of the embodiments described above may be embodied as a system, method or computer program product. Accordingly, aspects of the embodiments described above may take the form of an entirely hardware embodiment, an entirely software embodiment (including firmware, resident software, micro-code, etc.) or an embodiment combining software and hardware aspects that may all generally be referred to herein as a "circuit," "module", "unit" or "system." Furthermore, aspects of the embodiments herein may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments herein are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

PATENTS

Pat [1] Ilan Bar-On and Oleg Kostenko,
A New Algorithm for Video Compression,
App. No. PCT/IB2013/059007
Pat [2] Ilan Bar-On and Oleg Kostenko,
Multi-Level Spatial-Temporal Resolution Increase of Video
App. No. PCT/IB2014/062524
Pat [3] Ilan Bar-On and Oleg Kostenko,
A Method And A System For Wavelet Based Processing,
U.S. application Ser. No. 12/448,733

The invention claimed is:

1. A method of video compression by an encoder, comprising:
    a) receiving a block of, at least two, uncompressed video frames and creating therefrom a current block of video frames; and
    b) repeating the following steps I. through IV:
        I. compressing said video frames in said current block, wherein the last one or more consecutive resulting compressed video frames of the current block are partially compressed video frames that will require further compression and quality enhancement; and wherein the remaining first one or more consecutive resulting compressed video frames are fully compressed video frames that will not require further compression and quality enhancement;
        II. sending said compressed video frames of the current block to a decoder;
        III. receiving a next block of, at least one, uncompressed video frames; and
        IV. adjoining said received uncompressed video frames of said next block consecutively to said previously partially compressed video frames to create the new current block of video frames.

2. A method of video decompression by a decoder, comprising:
    receiving a plurality of encoded video frames comprising first one or more consecutive fully compressed video frames that will not require further compression and quality enhancement and last one or more partially compressed video frames that will require further compression and quality enhancement;
    decoding said plurality of encoded video frames, said decoding comprising decoding said one or more fully compressed video frames and said partially compressed video frames in said plurality of video frames; and
    repeatedly decoding next fully compressed one or more video frames and other partially compressed video frames.

3. The method of claim 1, wherein said next block of video frames comprises a predefined number of video frames.

4. The method of claim 1, wherein said next block of video frames comprises only one frame.

5. The method of claim 1, wherein said next block of video frames is adapted dynamically to satisfy existing working conditions.

6. The method of claim 5 wherein said existing working conditions comprise at least one of: required latency, fluctuations in the network bandwidth, memory constraints, CPU power and GPU availability.

7. A video codec comprising:
an encoding unit configured to:
   a) receive a block of, at least two, unencoded video frames and create from them a current block of video frames and
   b) repeat the following steps I. through IV:
      I. encode said video frames in said current block, wherein the last one or more consecutive resulting encoded video frames of the current block are partially encoded video frames that will require further encoding and quality enhancement; and wherein the remaining first one or more consecutive resulting encoded video frames are fully encoded video frames that will not require further encoding and quality enhancement;
      II. send said encoded video frames of the current block to a decoder;
      III. receive a next block of, at least one, unencoded video frames; and
      IV. adjoin said unencoded video frames of said received next block consecutively to said previously partially encoded video frames to create the new current block of video frames;
an entropy coding unit configured to create a compressed bitstream from said fully and partially encoded video frames; and
a decoding unit comprising:
an entropy decoding unit configured to receive the compressed bitstream and decompress it into a plurality of fully and partially encoded video frames; and
a reconstructing unit configured to decode said fully decompressed encoded video frames and said partially decompressed encoded video frames.

8. The video codec of claim 7, wherein said next block of video frames comprises a predefined number of video frames.

9. The video codec of claim 7, wherein said next block of video frames comprises only one frame.

10. The video codec of claim 7, wherein said next block of video frames is adapted dynamically to satisfy working conditions.

11. The video codec of claim 10 wherein said working conditions comprise at least one of: desired latency, fluctuations in the network bandwidth, memory constraints, CPU power and GPU availability.

12. The method of claim 1, wherein said compressing comprises using previously fully compressed video frames.

13. The video codec of claim 7, wherein said encoding comprises using previously fully encoded video frames.

* * * * *